US011752660B2

(12) United States Patent
Smeets et al.

(10) Patent No.: US 11,752,660 B2
(45) Date of Patent: Sep. 12, 2023

(54) AQUEOUS WAX EMULSIONS AND DISPERSIONS AND USES THEREOF

(71) Applicant: Walker Industries Holdings Limited, Thorold (CA)

(72) Inventors: Niels Mathieu Barbara Smeets, Courtice (CA); Laurence Anthony Sinnige, Burlington (CA); Azadeh Joshani, Hamilton (CA); Hyungseak Kim, Mississauga (CA)

(73) Assignee: WALKER INDUSTRIES HOLDINGS LIMITED, Thorold (CA)

( * ) Notice: Subject to any disclaimer, the term of this patent is extended or adjusted under 35 U.S.C. 154(b) by 221 days.

(21) Appl. No.: 17/003,318

(22) Filed: Aug. 26, 2020

(65) Prior Publication Data

US 2021/0060814 A1   Mar. 4, 2021

Related U.S. Application Data

(60) Provisional application No. 62/891,519, filed on Aug. 26, 2019.

(51) Int. Cl.
*B27N 1/00* (2006.01)
*B27N 3/02* (2006.01)
(Continued)

(52) U.S. Cl.
CPC ............ *B27N 3/002* (2013.01); *B27N 1/006* (2013.01); *B27N 3/02* (2013.01); *B27N 3/04* (2013.01); *C08L 91/06* (2013.01); *C08L 97/005* (2013.01); *C09D 191/06* (2013.01); *C09D 197/005* (2013.01)

(58) Field of Classification Search
CPC ........ B27N 1/006; B27N 1/02; B27N 1/0209; B27N 3/002; B27N 3/02; B27N 3/04; C08L 91/06; C08L 91/08; C08L 97/005; C08L 97/02; C09D 5/022; C09D 191/06; C09D 191/08; C09D 197/005; C09D 197/02

See application file for complete search history.

(56) References Cited

U.S. PATENT DOCUMENTS 2,349,326 A   5/1944   Wilson
4,740,591 A   4/1988   Dilling et al.
(Continued)

FOREIGN PATENT DOCUMENTS

WO   1992/018557        10/1992
WO      2010053494 A1    5/2010
(Continued)

OTHER PUBLICATIONS

Alwadani et al. "Synthetic and Lignin-based Surfactants: Challenges and Opportunities." Carbon Resources Conversion 1, Accepted Jul. 16, 2018 and available online Jul. 17, 2018. pp. 126-138.
(Continued)

*Primary Examiner* — Michael A Tolin
(74) *Attorney, Agent, or Firm* — Scully, Scott, Murphy & Presser, P.C.

(57) ABSTRACT

An aqueous wax emulsion or dispersion comprising, wax, water and an emulsifier wherein the emulsifier comprises purified kraft lignin and a water-soluble base. A process for preparing said aqueous wax dispersions and their use.

18 Claims, 7 Drawing Sheets

(51) Int. Cl.
| | |
|---|---|
| B27N 3/04 | (2006.01) |
| C08L 91/06 | (2006.01) |
| C08L 97/00 | (2006.01) |
| C09D 191/06 | (2006.01) |
| C09D 197/00 | (2006.01) |
| B27N 3/00 | (2006.01) |

(56) References Cited

U.S. PATENT DOCUMENTS

| | | | |
|---|---|---|---|
| 7,842,731 | B2 | 11/2010 | Eckert et al. |
| 9,091,023 | B2 | 7/2015 | Kousini et al. |
| 2012/0247617 | A1 | 10/2012 | Berlin et al. |
| 2013/0004279 | A1 | 2/2013 | Stuart et al. |
| 2013/0213550 | A1 | 8/2013 | Berlin |
| 2015/0322104 | A1* | 11/2015 | Tikka ............... D21C 11/0042 530/500 |
| 2019/0382582 | A1 | 12/2019 | Paris et al. |

FOREIGN PATENT DOCUMENTS

| | | |
|---|---|---|
| WO | 2014116150 A1 | 7/2014 |
| WO | 2018102378 A1 | 6/2018 |
| WO | 2019068180 A1 | 4/2019 |

OTHER PUBLICATIONS

Rayer et al. "Dissociation Constants (pKa) of Tertiary and Cyclic Amines: Structural and Temperature Dependences." Journal of Chemical and Engineering Data 59 (11): dx.doi.org/10.1021/je500680q. Accepted Oct. 7, 2014 and Published Oct. 20, 2014. pp. 3805-3813.

Rojas et al. "Lignins as Emulsion Stabilizers." Chapter 12 of Materials, Chemicals and Energy, from Forest Biomass ACS Symp. Series, 958. Apr. 16, 2007. pp. 182-199.

Ragnar et al. Appendix on the poster "On the Dissociation Constants of Phenolic Groups in Lignin Structures" presented at the 10th International Symposium on Wood and Pulping Chemistry (ISWPC), Yokohama, Japan, Jun. 7-10, 1999. 2 pages.

Tolosa et al. "Effect of Fenton's Reagent on O/W Emulsions Stabilized by Black Liquor." Journal of Colloid and Interface Science 294 (1): https://doi.org/10.1016/j.jcis.2005.06.092. Accepted Jun. 29, 2005 and available online Aug. 2, 2005. pp. 182-186.

Yuliestyan, et al. "Assessment of Modified Lignin Cationic Emulsifier for Bitumen Emulsions used in Road Paving." Materials and Design 131: https://doi.org/10.1016/j.matdes.2017.06.024. Accepted Jun. 11, 2017 and available online Jun. 13, 2017. pp. 242-251.

Yuliestyan, et al. "Sustainable Asphalt Mixes Manufactured with reclaimed Asphalt and Modified-lignin-stabilized Bitumen Emulsions." Construction and Building Materials, 173: https://doi.org/10.1016/j.conbuildmat.2018.04.044. Accepted Apr. 5, 2018 and available online Apr. 24, 2018. pp. 662-671.

He et al. "Preparation of Sulfomethylated Softwood Kraft Lignin as a Dispersant for Cement Admixture." RSC Advances, 5(58): https://doi.org/10.1039/c5ra04526f. May 8, 2015. pp. 47031-47039.

He et al. "Sulfomethylated Kraft Lignin as a Flocculant for Cationic Dye." Colloids and Surfaces A: Physicochemical and Engineering Aspects, 503: https://doi.org/10.1016/j.colsurfa.2016.05.009. Accepted May 3, 2016 and available online May 4, 2016. pp. 19-27.

Li et al. "Carboxymethylated Lignins with Low Surface Tension toward Low Viscosity and highly Stable Emulsions of crude Bitumen and Refined oils." Journal of Colloid and Interface Science, 482: https://doi.org/10.1016/j.jcis.2016.07.063. Accepted Jul. 25, 2016 and available online Jul. 26, 2016. pp. 27-38.

Gupta et al. "Polymer-Grafted Lignin Surfactants Prepared via Reversible Addition—Fragmentation Chain-Transfer Polymerization." Langmuir, 30(31): https://doi.org/10.1021/la501696y. Jul. 21, 2014. pp. 9303-9312.

Qian et al. "CO2-responsive Diethylaminoethyl-modified Lignin Nanoparticles and their Application as Surfactants for CO2/N2-switchable Pickering Emulsions." Green Chemistry, 16(12): https://doi.org/10.1039/c4gc01242a. Aug. 13, 2014. pp. 4963-4968.

Schmidt et al. "Lignin-based Polymeric Surfactants for Emulsion Polymerization." Polymer, 112(4): https://doi.org/10.1016/j.polymer.2017.02.036. Accepted Feb. 8, 2017. 32 pages.

Ragnar et al. "pKa-Values of Guaiacyl and Syringyl Phenolsrelated to Lignin." Journal of Wood Chemistry and Technology, 20(3), Published in 2000. pp. 277-305.

\* cited by examiner

| Producer | Process | Tradename |
|---|---|---|
| Domtar | LignoBoost | BioChoice |
| Stora Enso | LignoBoost | Lineo |
| UPM | LignoBoost | BioPiva |
| West Fraser | LignoForce | Amallin |

FIG. 1 (Prior Art)

AQUEOUS WAX EMULSIONS AND DISPERSIONS AND USES THEREOF

CROSS REFERENCE TO RELATED APPLICATIONS

The present application claims priority under the Paris Convention to U.S. Application No. 62/891,519, filed on Aug. 26, 2019. The content of such prior application is incorporated herein by reference as if set forth in its entirety.

FIELD OF THE INVENTION

In one aspect, the present invention relates to an aqueous wax formulation for use in the manufacture of composite wood panels and methods of formulating same. More specifically, the aqueous wax formulation is an aqueous wax emulsion or an aqueous wax dispersion for use in the manufacture of composite wood panels and methods of formulating same. More specifically, an aqueous wax emulsion or aqueous wax dispersion including lignin and a base as an emulsifying agent.

BACKGROUND OF THE INVENTION

The manufacture of wood based panels such as particleboard, fibreboard (MDF, HDF and OSB) and the like (collectively referred to herein as "composite wood panels") generally comprises a first step of combining wood chips or particles and an adhesive. The mixture is then formed into a mat, which is then heated under pressure to cure the adhesive and to form the desired panel. Formaldehyde based resins, such as urea-formaldehyde (UF), are typical adhesives used in the manufacture of such panels. Other types of resins not containing UF may also be used.

In order to impart water repelling, or hydrophobing, characteristics to composite wood panels, it is known to include a wax component into the panel manufacturing process. Thus, once the panel is made, the hydrophobic component serves to repel water from being absorbed, thereby preventing deterioration of the panel. Additionally, the presence of wax improves the ease of manufacturing of composite wood panels.

Aqueous wax emulsions and dispersions are known for use in the manufacture of composite wood panels. Generally, manufacture of aqueous wax emulsions and dispersions comprises the emulsification of molten wax with an aqueous phase containing an emulsifier under high shear. In the case of dispersions the emulsified molten wax and aqueous phase are allowed to cool below the wax melting point temperature. The emulsifier may consist of an alkyl fatty acid in combination with a complementary organic base, as is for example described in U.S. Pat. No. 2,349,326. Additionally, other emulsifiers may be used as disclosed in WO2010053494A1 or U.S. Pat. No. 7,842,731 B1, comprising lignosulfonate.

It has been well understood that the presence of an emulsifier is necessary to produce an aqueous wax dispersion, and to provide sufficient stability for the aqueous wax dispersion to be useful in the intended application. However, presence of an emulsifier adversely affects some other characteristics of the aqueous wax dispersion. For example, the use of an emulsifier may induce foaming or impede the water repellent performance of the wax. With increased loading of these emulsifiers, foaming typically increases and water repellant performance typically deteriorates. The use of an emulsifier in an aqueous wax dispersion thus constitutes a trade-off between the aqueous wax dispersion stability and its performance. Emulsifiers known in the art for the manufacture of aqueous wax dispersions are generally used at a level that provides an acceptable comprise between stability and performance. This compromise thus sacrifices water repellent performance in order to achieve sufficient aqueous wax dispersion stability for production, transport, storage, and use. Emulsifiers are also used in the manufacture of aqueous wax emulsions to provide sufficient stability for the emulsions to be useful in the intended application. The use of emulsifiers in the manufacture of aqueous wax emulsions results in similar trade-offs to those described for dispersions.

As a result, there is a need in the art for emulsifiers for aqueous wax emulsions and dispersions combining excellent aqueous wax emulsion or dispersion stability without compromising moisture repellent performance of wax in composite wood panels.

SUMMARY OF THE INVENTION

It has been found that lignin in the presence of a water-soluble base can act as an emulsifying agent in an aqueous wax emulsion or an aqueous wax dispersion. Accordingly, in one aspect of the application there is provided an aqueous wax formulation which may be an aqueous wax emulsion or an aqueous wax dispersion comprising a wax, water, and an emulsifier comprising lignin and a water-soluble base.

In another aspect of the application there is provided a method of producing an aqueous wax emulsion comprising i) preparing an aqueous phase containing an emulsifier comprising lignin and a water-soluble base; ii) emulsifying molten wax with the aqueous phase. The method may further comprises the optional step of keeping or storing the aqueous wax emulsion at a temperature above the congealing point of the wax and under gentle agitation.

In another aspect of the application there is provided a method of producing an aqueous wax dispersion comprising i) preparing an aqueous phase containing an emulsifier comprising lignin and a water-soluble base; ii) emulsifying molten wax with the aqueous phase and iii) cooling to below the congealing point of the wax to form the aqueous wax dispersion.

In a further aspect of the application there is provided a use of an aqueous wax emulsion or dispersion as described above in the manufacture of composite wood panels.

In yet a further aspect of the application there is provided a method of manufacturing a composite wood panel comprising the steps of (i) blending lignocellulosic material in the presence of an adhesive resin and an aqueous wax emulsion or aqueous wax dispersion as described above, (ii) forming the blended lignocellulosic material containing adhesive and aqueous wax emulsion or aqueous wax dispersion, and (iii) consolidating the formed lignocellulosic material using pressure and temperature.

BRIEF DESCRIPTION OF THE DRAWINGS

FIG. 1 (prior art) is a chart showing commercially available purified Kraft lignins.

DETAILED DESCRIPTION OF THE INVENTION

Figure 2:
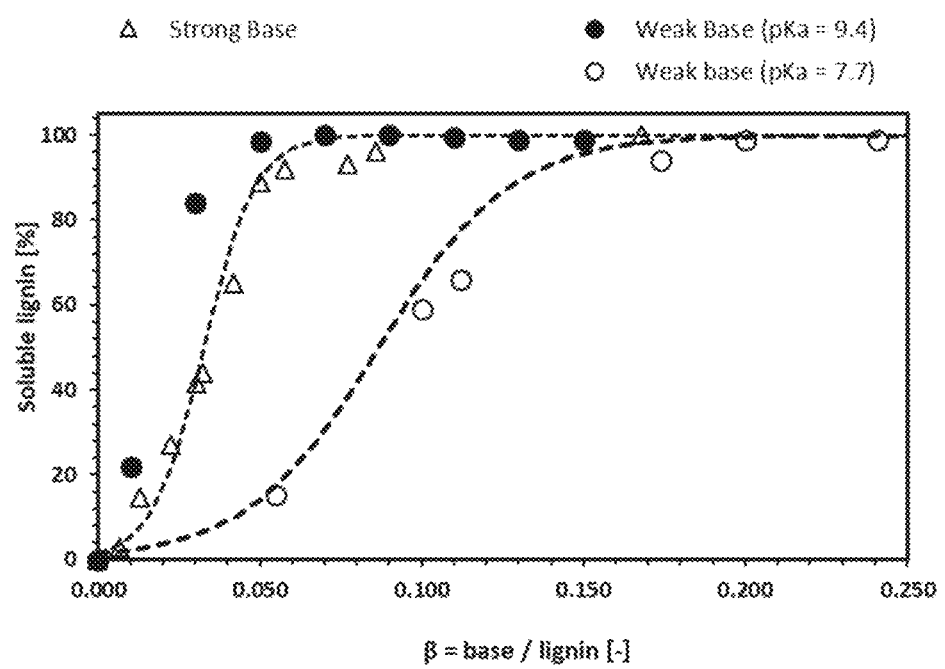
FIG. 2 is a graph showing the relative lignin solubility as a function of the equivalent base mass ratio for a strong base and for weak bases of different pKa.

In accordance with one embodiment of the invention, there is provided lignin containing aqueous wax dispersions, their composition, methods of manufacture and use in the manufacture of composite wood panels. In accordance with another embodiment of the invention there is provided lignin containing aqueous wax emulsions, their composition, methods of manufacture and use in the manufacture of composite wood panels.

As used herein, the following terms will be understood to have the following meanings.

"Composite wood panel", or "panel", as used herein, will be understood to mean any form of wood or cellulosic material-based panel. "Composite wood panel" will be understood to include particleboard, fibreboard, such as medium density fibreboard (MDF) and high density fibreboard (HDF), flakeboard, chipboard, oriented strand board (OSB), waferboard and other similar products, wherein wood or cellulosic material is mixed with adhesive and formed into a flat panel.

"Wood particles" will be understood to mean wood or lignocellulosic material commonly used in manufacturing composite wood panels. This term will, therefore, be understood to include wood particles, wood chips, wood shavings, wood wafers, wood strands, sawdust or other similar materials.

"Dispersion", as used with respect to the present invention, will be understood to mean a composition comprising a continuous aqueous phase and solid dispersed phase.

"Emulsion", as used with respect to the present invention, will be understood to mean a composition comprising a continuous aqueous phase and liquid dispersed phase. As known in the art, the term "emulsion" may be used in the reverse, namely, to identify a liquid aqueous phase dispersed within a continuous non-aqueous phase. However, for the purposes of the present description, the invention will generally be described in terms of the former meaning.

"Wax" as used herein will be understood to mean any know waxes that are suitable for use in manufacturing composite wood panels. For example, the wax component may comprise a natural wax, such as petroleum, vegetable, or animal derived waxes, or a synthetic wax. The petroleum wax may comprise a paraffin wax in the form of a scale wax or slack wax, as obtained from petroleum distillation processes. In addition, the invention provides for the use of various natural waxes such as vegetable-based waxes. Thus, the invention may incorporate any wax or wax-like material that would normally be used in the art, or combinations and mixtures thereof.

"Emulsifier" as used herein will be understood to be a surface active agent (also called a "surfactant") which lowers the surface tension of the medium in which it is dissolved, and/or lowers the interfacial tension with other phases. The emulsifier facilitates the formation of an emulsion and increases the colloidal stability of the resulting emulsion of dispersion (IUPAC, Compendium of Chemical Terminology, 2nd ed. (the "Gold Book") Compiled by A. D. McNaught and A. Wilkinson. Blackwell Scientific Publications, Oxford (1997)).

"Solids" or "solids content" as used herein will be understood to refer to the amount (expressed as a weight percentage) of non-volatile material in the dispersion. More accurately, these terms refer to the total amount of non-volatile material that remains after evaporation or drying to a constant weight.

"Lignin" as used herein refers to a "technical lignin" which comprises a complex mixture of macromolecules consisting of coniferyl (guaiacyl), synapyl (synringyl), and p-coumaryl (p-hydroxyphenyl) repeat units, extracted from lignocellulosic materials such as wood. Important physiochemical properties of lignin such as the molecular weight, ash content, hydroxyl number, and so on vary with the process used to extract lignin.

"Kraft lignin" as used herein refers to a "technical lignin" that is extracted from wood using the Kraft pulping process. In particular examples, the Kraft lignin is a purified Kraft lignin. The term "purified Kraft lignin" as used herein refers to a Kraft lignin which has been purified or extracted using the LignoBoost process (as disclosed in WO2014 116150A1), or the LignoForce process (as disclosed in U.S. Pat. No. 9,091,023 B2), or other similar process. Examples of commercial sources of purified Kraft lignin include Amallin LPH™ and Amallin HPH™ from West Fraser, BioChoice™ from Domtar, Lineo from Stora Enso, and BioPiva from UPM.

The "equivalent lignin mass ratio" or "$\alpha$" as used herein refers to the weight ratio of lignin and wax of the aqueous wax dispersion or aqueous wax emulsion. $\alpha$=dry mass of lignin/mass of wax.

The "equivalent base mass ratio" or "$\beta$" as used herein refers to the weight ratio of base and lignin of the aqueous wax dispersion or aqueous wax emulsion. $\beta$=dry mass of base/dry mass of lignin.

The "equivalent solubilized lignin mass ratio" or "$\gamma$" as used herein refers to the weight ratio of solubilized lignin and wax of the aqueous wax dispersion or aqueous wax emulsion. $\gamma$=dry mass of solubilized lignin/mass of wax.

It has been found that lignin and particularly purified Kraft lignin is a novel emulsifier that can be used in the preparation of aqueous wax dispersions or aqueous wax emulsions. Additionally, it has been found that the use of a lignin emulsifier and particularly a purified Kraft lignin emulsifier results in the production of aqueous wax dispersions or aqueous wax emulsions that have superior properties as compared to aqueous wax dispersion or aqueous wax emulsions formed using emulsifiers previously known in the art.

In particular, it has been found that compositions for an aqueous wax dispersion or an aqueous wax emulsion comprising lignin as the emulsifier are not hampered by the same trade-off between dispersion stability and performance in use as previously known emulsifiers. Lignin emulsifiers provide excellent stability even at low loading. Further it has been found that increasing the lignin loading does not cause foaming of the aqueous wax dispersion. It has also been demonstrated that, for the use in composite wood panels, aqueous wax dispersions from this invention have better water-repellent performance when compared to other known emulsifiers. Similar results are expected using aqueous wax emulsions.

Lignin generally refers to complex polyphenolic polymers formed from coniferyl (guaiacyl), synapyl (synringyl), and p-coumaryl (p-hydroxyphenyl) repeat units. Lignin is extracted from lignocellulosic material using a variety of industrial processes, such as kraft or soda pulping, sulphite pulping, bioethanol production, etc. Technical lignin isolated from these processes include Kraft lignin, soda lignin, lignosulfonates, organsolv lignin, etc. The lignin used in this invention preferentially comprises a purified form of lignin that can be solubilized in water. In a particular embodiment, the lignin is a purified form of lignin extract obtained from black liquor in the Kraft process.

Kraft lignin is extracted from black liquor as a by-product from the Kraft pulping process. Kraft lignin can be further processed and purified. Commercial processes have been developed for extracting and purifying the Kraft lignin, generally involving acidification of the black liquor using carbon dioxide followed by a coagulation stage, filtration and washing with acid and water. Examples of such processes are described in WO2014 116150A1 ("LignoBoost process"), or U.S. Pat. No. 9,091,023 B2 ("LignoForce process"). The resulting Kraft lignin is of high purity and can be suspended in water to form a Kraft lignin suspension with a pH of 2-4.

For the purpose of acting as an emulsifier for aqueous wax dispersions, the Kraft lignin first needs to be solubilized. For example, Rojas and co-workers reported in "Lignins as Emulsion Stabilizers", Chapter 12 of *Materials, Chemicals, and Energy in Forest Biomass*, 2007, pg. 182-199, that dissolved Kraft and soda lignins can be used as polymeric amphiphiles for the stabilization of emulsions, but that their performance is heavily dependent on the pH. Without wishing to be bound to theory, it is believed that the solubility of Kraft lignin is controlled by the distribution of phenolic hydroxyl groups, and the pH of the medium. Kraft lignin contains a range of structurally similar guaiacyl and syringyl phenols that vary in pKa [see "pKa-values of Guaiacyl and Syringyl Phenols Related to Lignin", by Ragnar, M.; Lindgren, C. T. and Nilvebrant N.-O., J. Wood Chem. Technol. 2000, 20(3), 277-305], giving rise to an approximate pKa of lignin ranging from 9.4 to about 10.8. Dissolution of Kraft lignin, i.e. deprotonation of its acidic form, can therefore only be achieved in the presence of a sufficient quantity of a base of sufficient strength.

It has been found that for the purified Kraft lignin to act as an emulsifying agent for aqueous wax dispersions or aqueous wax emulsions, a complementary water-soluble base needs to be used.

Bases are well known in the art and are generally understood to be compounds that can accept a proton, as described in the Brønsted-Lowry theory. A strong base is understood to be a base that fully dissociates in water. A weak base is understood to be a base that partially dissociates in water, the extent of which is described by the negative log of the acid dissociation constant pKa.

The presence of the water-soluble base raises the pH of the medium, which results in the deprotonation of the phenolic hydroxyls and, subsequently, dissolution of the lignin macromolecule. Suitable bases for solubilizing purified Kraft lignin include water-soluble strong bases. Other suitable bases for solubilizing purified Kraft lignin include water-soluble weak bases with a pKa of approximately 9.4 or higher. Still, other suitable bases for solubilizing purified Kraft lignin include water-soluble bases with a pKa of lower than 9.4. Various such suitable water-soluble bases would be known to one of skill in the art. The amount of base required to achieve complete solubility of the purified Kraft lignin is a function of the pKa of the base. As such, bases with a pKa of approximately 9.4 or higher are preferred, on the basis that substantially less base is required to achieve complete dissolution of the Kraft purified lignin macromolecules.

In one embodiment bases for the invention have a pKa of approximately 9.4 and higher including potassium hydroxide, sodium hydroxide, and monoethanolamine.

Without intending to be bound by theory, it may be considered advantageous to use a suitable volatile water-soluble base for the purpose of the invention. The aqueous wax dispersions and aqueous wax emulsions disclosed herein may be used in the production of composite wood panel. The production of such composite wood panel typically involves hot pressing of the materials to form the panel. A volatile base in its neutral form is likely to evaporate during hot pressing, thereby shifting the pH and acid-base equilibrium and driving purified Kraft lignin to its water-insoluble and thus more hydrophobic state. The term "volatile base" as used to herein refers to an organic base that can evaporate under typical board pressing conditions used in the production of composite wood panels. Examples of volatile bases suitable for this application include monoethanolamine, diethanolamine, triethanolamine, morpholine and aqueous ammonia.

Figure 4:
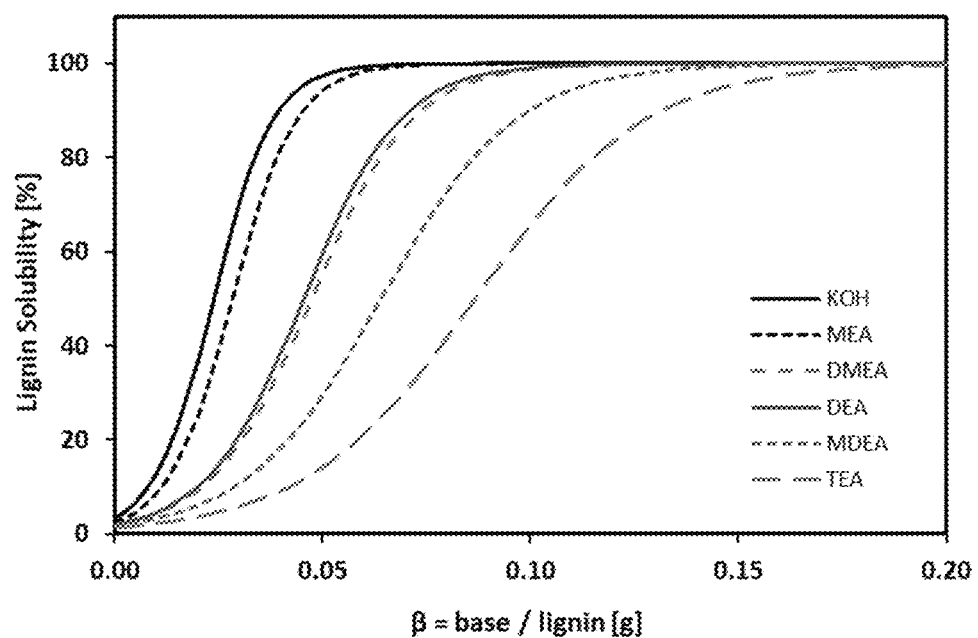
FIG. 4 is a graph comparing percentage of lignin solubility as a function of the equivalent mass ratio of base to lignin for different bases. The curves shown represent a best fit of the experimental data according to Equation 1. Data points have been omitted for clarity reasons.

The amount of a suitable water-soluble base required to solubilize lignin is expressed as the equivalent base mass ratio or β. A graphical representation of purified Kraft lignin solubility relative to β for various bases is shown in FIG. 4. For a particular purified Kraft lignin, the relative solubility can be expressed as a function of the pH or the equivalent base mass ratio β. For example, for a purified Kraft lignin produced by West Fraser (Amallin LPH™) and a water soluble base with a pKa of approximately 9.4 or higher such as potassium hydroxide (pKa=15.1), sodium hydroxide (pKa=14.6), or monoethanolamine (pKa=9.45) the percentage solubility can be estimated by Equation 1:

$$\% \text{ Solubility} = [1/(0.01 + 0.99 \exp(-150(\beta - 0.006)))] \quad \text{(Eq. 1)}$$

It then follows from Equation 1, that a minimum equivalent base mass ratio or β min of 0.07 is required to fully solubilize this purified Kraft lignin with a base with a pKa of approximately 9.4 or higher such as potassium hydroxide, sodium hydroxide, or monoethanolamine. More preferably the base to lignin ratio of $\beta \geq 0.10$ is selected to fully solubilize this purified Kraft lignin.

A graphical representation of the relative lignin solubility as a function of the equivalent base mass ratio for potassium hydroxide and monoethanolamine can be seen in FIG. 2.

Alternatively, for a purified Kraft lignin produced by West Fraser (Amallin LPH™) and a water soluble base with a pKa of lower than 9.4 such as dimethylethanolamine (pKa=9.31), diethanolamine (pKa=8.96), methyldiethanolamine (pKa=8.54), or triethanolamine (pKa=7.73) the percentage solubility is dependent upon the pKa of the base. The correlation between the base pKa and the minimum equivalent base mass ratio β min can be approximated using a linear correlation as described by Equation 2:

$$\beta\ min = -0.049 * pKa + 0.547 \qquad (Eq.\ 2)$$

It then follows from Equation 2, that the minimum equivalent base mass ratio β min can vary from 0.17 (pKa=7.73) to 0.095 (pKa=9.31).

Figure 5:
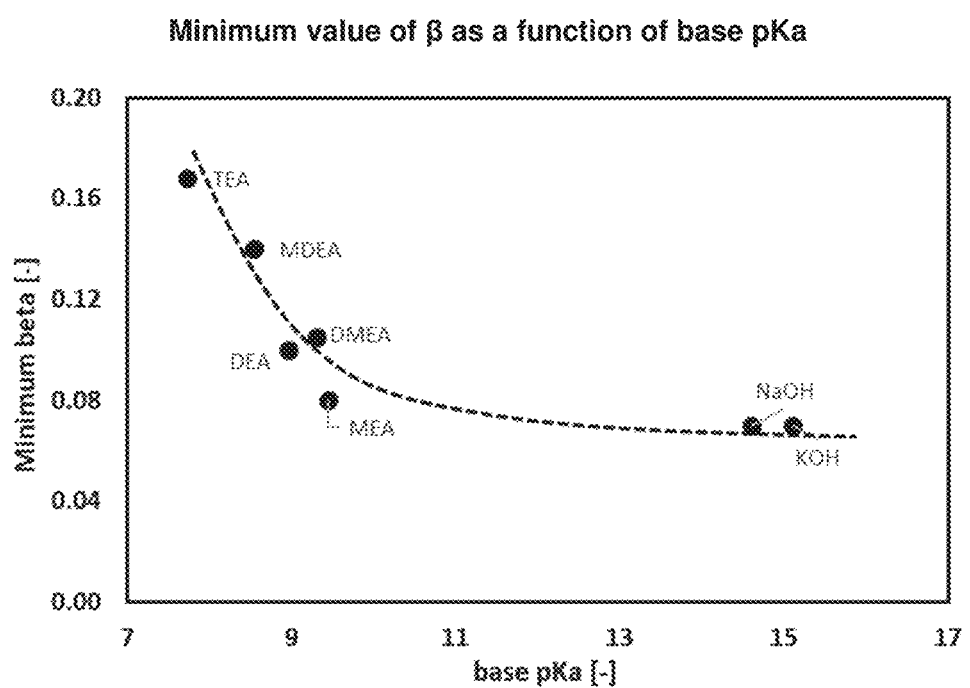
FIG. 5 is a graph showing the minimum equivalent mass ratio of base to lignin value as a function of base pKa for 7 bases. The pKa values in the graph were obtained from Rayer, A. V., Sumon, K. A., Jaffari, L. and Henni, A., Dissociation constants (pKa) of tertiary and cyclic amines: Structural and temperature dependencies, Journal of Chemical and Engineering Data 59(11) 3805-3813, 2014 and "pKb werte" (http://www.periodensystem-online.de/index.php?sel=abc&prop=pKb-Werte&show=list&el=4&id=acid).

A graphical representation of the minimum equivalent base mass ratio for various bases having different pKa is shown in FIG. 5.

Sodium carbonate having a pKa of 10.4 can be used to solubilize purified Kraft lignin. However, sodium carbonate has been found in some cases to cause extremely high viscosity when used at an equivalent base mass ratio 0.07 or higher which may be detrimental in some circumstances.

It has further been found that aqueous wax dispersions prepared with the purified Kraft lignin, Amallin LPH™, at an equivalent base mass ratio 3 times the minimum equivalent base mass ratio were found to be unstable, indicating that there is a maximum equivalent base mass ratio.

The waxes that can be used in the formulations of the present invention may comprise any known waxes that are suitable for use in manufacturing composite wood panels. For example, the wax component of the aqueous wax dispersion or aqueous wax emulsion may comprise any natural wax, such as petroleum, vegetable derived waxes, or animal derived wax such as tallow, or any synthetic wax.

In one embodiment, the aqueous wax dispersion or aqueous wax emulsion comprises a petroleum derived wax. In a particular example, the derived petroleum wax may comprise a paraffin wax in the form of a scale wax or slack wax, as obtained from petroleum distillation processes. In a further embodiment, the wax has a melting point of about 45° C. to about 90° C.

In another embodiment, the dispersion or emulsion comprises a vegetable derived wax. In a particular embodiment, the wax comprises hydrogenated vegetable oil. Suitable hydrogenated vegetable oils include, but are not limited to, hydrogenated soybean oil, hydrogenated palm oil, hydrogenated sunflower oil, hydrogenated canola oil, hydrogenated corn oil, hydrogenated olive oil, hydrogenated peanut oil, hydrogenated safflower oil or mixtures thereof. The use of vegetable based waxes is known to have various economic and environmental advantages.

The solids content of the aqueous wax dispersions disclosed here includes wax, base, and lignin. Lignin and the base are preferentially located in the aqueous continuous phase of the aqueous wax dispersion or aqueous wax emulsion.

Aqueous wax dispersions are kinetically stable, that is they demonstrate stability only for a limited period of time after which the dispersion breaks (i.e. the dispersion separates into a wax and aqueous phase). The process by which an aqueous wax dispersion completely breaks is generally considered to be related to a change in the particle size distribution due to flocculation, resulting in creaming and sedimentation. Macroscopically, these processes are observed as stratification of the dispersion (creaming) or fallout of wax particles (sedimentation).

Aqueous wax emulsions are kinetically stable, that is they demonstrate stability only for a limited period of time after which the emulsion breaks (i.e. the emulsion separates into a liquid wax and aqueous phase). The process by which an aqueous wax emulsion breaks is generally considered to be related to a change in the droplet size distribution due to coalescence. Macroscopically, this process is observed as de-emulsification.

A stable aqueous wax dispersion is thus defined as a dispersion that remains free from wax fallout for a period of at least 2 weeks.

An unstable aqueous wax dispersion is then defined as a dispersion that displays wax fallout within a period of 2 weeks.

A stable aqueous wax emulsion is thus defined as an emulsion that remains free from de-emulsification for at least 1 hour under gentle agitation.

An unstable aqueous wax emulsion is then defined as an emulsion that displays de-emulsification within 1 hour under gentle agitation.

Stable aqueous wax emulsions and dispersions can be produced using a lignin emulsifier, provided the absolute amount of lignin is sufficient to emulsify and stabilize the wax particles. For a purified Kraft lignin produced by West Fraser (Amallin LPH™) and a water soluble strong base with a pKa of approximately 9.4 or higher the absolute amount of purified Kraft lignin that is present in the aqueous phase as an emulsifier can then be described by Equation 3:

$$\gamma = \alpha[1/(0.01 + 0.99\ \exp(-150(\beta - 0.006)))] \qquad (Eg.\ 3)$$

Stable aqueous wax emulsions and dispersions can be produced using a lignin emulsifier using an equivalent solubilized lignin mass ratio of $0.008 < \gamma \leq 0.25$. Preferentially, an equivalent solubilized lignin mass ratio of $0.01 < \gamma \leq 0.10$, more preferentially an equivalent solubilized lignin mass ratio of $0.01 < \gamma \leq 0.04$.

Aqueous wax dispersions produced in the presence of an insufficient amount of a suitable base contain insoluble lignin, which will settle from the aqueous wax dispersion under the force of gravity. Aqueous wax dispersions which contain insoluble lignin may not be suitable for all the intended applications.

While not intending to be bound by theory, for some applications it may be considered advantageous to only partially solubilize the lignin. For example, using a suitable base below the minimal equivalent base mass ratio β but in the presence of a sufficiently high equivalent lignin mass ratio α, the criterion for the equivalent solubilized lignin mass ratio γ is met and an aqueous wax dispersion can be made. The insoluble lignin present in the aqueous wax dispersion remains in its neutral and thus more hydrophobic form, which may provide a performance benefit in at least some of the intended applications of the invention.

As known in the art, different high shear mixing devices may be used to emulsify wax with the aqueous phase containing the lignin emulsifier to form a stable wax emulsion which may be used directly or may be cooled to a stable aqueous wax dispersion. The efficiency of the high shear mixing device is dependent on the energy provided to create sufficient inertial forces to overcome the surface tension forces. Commonly used high shear devices include rotor-stator mixers and high-pressure homogenizers. In both devices, a coarse emulsion of two immiscible liquids passes through a narrow gap, which causes high inertial forces that result in one of the liquid phases to break up in small droplets. Another type of emulsification device is based on ultrasonic cavitation, where high intensity ultrasound generates cavitation bubbles that, upon implosion, cause intensive shockwaves and high local velocities which can emulsify one liquid in another. These high shear mixing devices are commonly used to produce aqueous wax dispersions.

Yet another shear mixing device is based on hydrodynamic cavitation (a so-called liquid whistle), where a coarse emulsion of two immiscible liquids at high pressure passes through a narrow orifice and over a blade, causing formation of cavitation bubbles that, upon implosion, cause intensive shockwaves and high local velocities which can emulsify one liquid in another. An example of such as device is the Sonolator™ as produced by Sonic Corporation.

The aqueous wax dispersions and aqueous wax emulsions of this invention can be produced using different high shear mixing devices, including the Silverson™ mixer (rotor-stator type), APV 31MR Lab Homogenizer (homogenizer type), and the Sonolator™ (hydrodynamic cavitation type).

When used in the manufacture of composite wood panels, aqueous wax dispersions and aqueous wax emulsions may be pumped, stored, sprayed, and potentially mixed with plant water, resin or other additives. These manipulations demand a degree of resistance to shear (pumping and spraying), changes in electrolyte concentration (mixing), and foaming (pumping and storage).

When compared to the prior art, the aqueous wax dispersion and aqueous wax emulsion according to this invention provide one or more of the following advantages:

A) Improved shear stability
B) Reduced foaming tendency and reduced foam persistence
C) Improved electrolyte stability
D) reduced effect on moisture repellent performance of wax, particularly at higher emulsifier loading.

Aspects of the invention will now be described in terms of specific examples. It will be understood that the purpose of all examples contained herein is solely to illustrate the invention and that such examples are not intended to limit the invention in any way.

EXAMPLES

Lignin Sources

In one embodiment, black liquor obtained from the Kraft pulping process may be used directly as the source of lignin. However, it has been found that the use of black liquor (obtained directly from Kraft process) as the lignin source is less preferred because a) the black liquor has a low solids content requiring concentration of the material prior to its use, b) this material has a low lignin fraction and c) it contains other contaminants such as salts and sugars which have been found to destabilize the wax dispersion in use.

In another embodiment the Kraft lignin is purified prior to use in the aqueous wax dispersions of the present application. Various sources of commercially available purified Kraft lignin were evaluated and were found to be able to successfully stabilize an aqueous wax dispersion. FIG. 1 provides examples of commercially available purified Kraft lignins.

Solubilizing Lignin

The fraction of soluble versus suspended, insoluble, purified Kraft lignin was determined by adding solid purified Kraft lignin powder to hot water at 80° C. containing a predetermined amount of a water-soluble base under vigorous agitation. The resulting mixture (20 w/w % solids) was agitated for 10 minutes, cooled, and any remaining suspended purified Kraft lignin allowed to settle under the force of gravity. The fraction of soluble purified Kraft lignin was determined from a solids reading of the clear aqueous layer (in duplicate).

FIG. 2 demonstrates that for a strong base, such as potassium hydroxide, a minimum equivalent base mass ratio $\beta$ min is required to achieve complete lignin solubility. Here, this minimum equivalent base mass ratio was determined to be approximately $\beta$ min=0.07±0.01. This minimum equivalent base mass ratio was found to be the same for other strong bases such as sodium hydroxide and weak bases with a pKa of approximately 9.4 or higher such as monoethanolamine. For a weak base with a pKa lower than approximately 9.4 the minimum equivalent base mass ratio varies with the pKa of the base. For dimethylethanolamine (pKa=9.31), diethanolamine (pKa=8.96), methyldiethanolamine (pKa=8.54), or triethanolamine (pKa=7.73) the minimum equivalent base mass ratios were determined to be approximately $\beta$ min=0.11±0.01, 0.10±0.01, 0.14±0.01, and 0.17±0.01, respectively. A graphical representation of lignin solubility relative to $\beta$ for various bases is shown in FIG. 4.

Purified Kraft lignin Emulsifier

Standard Procedure: Aqueous wax dispersions were prepared using the following standard procedure. Emulsifying molten wax with an aqueous phase containing the water-soluble base and purified Kraft lignin. First, the molten wax and aqueous phase are emulsified under high shear to form a coarse emulsion. Second, the coarse emulsion is passed through a high-shear homogenizer to form a fine emulsion. Finally, the fine emulsion is cooled quickly to below the wax congealing point to form the final aqueous wax dispersion.

Following the standard procedure described above, but in the absence of lignin, no aqueous wax dispersion is formed, and the coarse emulsion formed under high shear immediately breaks once shearing is stopped.

Again, following the standard procedure, but in the absence of a water-soluble base, the coarse emulsion formed under high shear immediately breaks once shearing is stopped. This example demonstrates that in the absence of a water-soluble base no aqueous wax dispersion can be formed, and that under those conditions the purified Kraft lignin does not function as a suitable emulsifier.

In the presence of a suitable water-soluble base that is below the minimal equivalent base mass ratio, an aqueous wax dispersion may be formed using the standard procedure described above, but only if a sufficient amount of purified Kraft lignin is dissolved in the aqueous phase. However, as the insoluble purified Kraft lignin settles, this aqueous wax dispersion may be unsuitable for use in the intended application for the manufacture of composite wood panels.

In the presence of a suitable water-soluble base having a pKa of approximately 9.4 or higher that is at or above the minimal equivalent base mass ratio ($\beta$>0.07), an aqueous wax dispersion is formed using the standard procedure described above. However, only if the absolute amount of dissolved purified Kraft lignin is sufficient. The resulting aqueous wax dispersion is stable and homogeneous in appearance.

In the presence of a suitable water-soluble base having a pKa of lower than 9.4 that is at or above the minimal equivalent base mass ratio $\beta$ min for that particular base, an aqueous wax dispersion may be formed using the standard procedure described above. However, only if the absolute amount of dissolved purified Kraft lignin is sufficient. The resulting aqueous wax dispersion is stable and homogeneous in appearance.

Table 1 describes aqueous wax dispersions made using various bases of differing pKa.

| Base | Abbr. | pKa [—] | pKa Reference | Solubility at β = 0.10 [%] | $\beta_{min}$ [—] | Stable Dispersion |
|---|---|---|---|---|---|---|
| Triethanolamine | TEA | 7.73 | 1 | 66 | 0.17 | Yes |
| Methyldiethanolamine | MDEA | 8.54 | 1 | 90 | 0.14 | Yes |
| Diethanolamine | DEA | 8.96 | 1 | 99 | 0.10 | Yes |
| Dimethylethanolamine | DMEA | 9.31 | 1 | 99 | 0.11 | Yes |
| Monoethanolamine | MEA | 9.45 | 1 | 100 | 0.08 | Yes |
| Sodium Carbonate | SC | 10.4 | 2 | 100 | 0.07 | Yes |
| Potassium Hydroxide | KOH | 15.1 | 2 | 100 | 0.07 | Yes |
| Sodium Hydroxide | NaOH | 14.56 | 2 | 100 | 0.07 | Yes |

Figure 3:
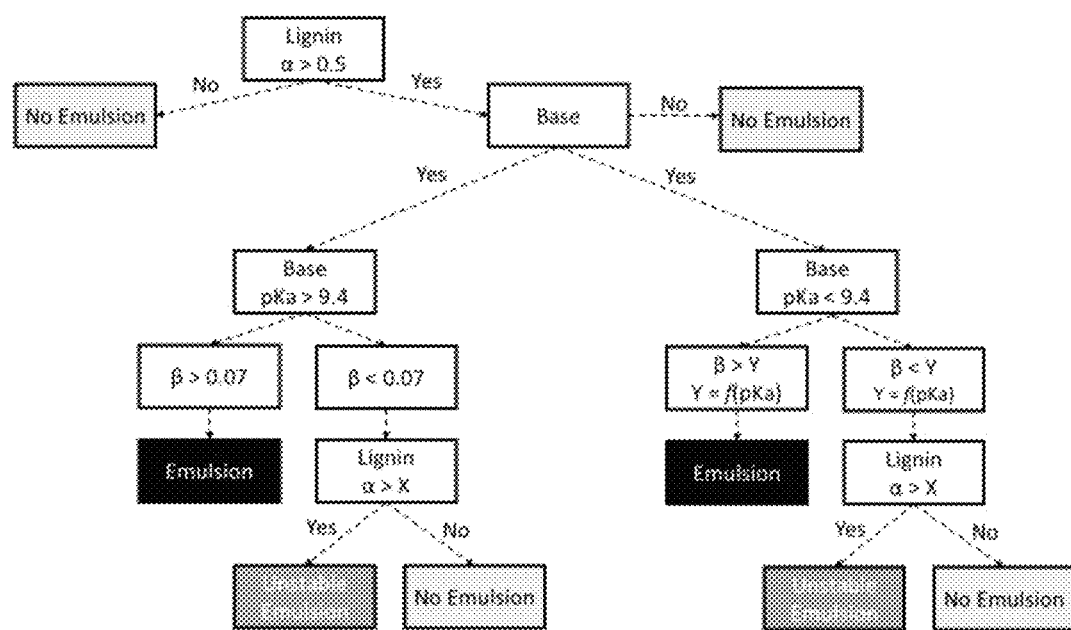
FIG. 3 is a flow chart depicting exemplary embodiments of aqueous wax dispersion compositions comprising lignin as an emulsifier.

Reference:
1. Rayer, A. V., Sumon, K. A., Jaffari L/and Henni, A., Dissociation constants (pKa) of tertiary and cyclic amines: Structural and temperature dependencies, Journal of Chemical and Engineering Data 59(11) 3805-3813, 2014.
2. "pKb Werte" http://www.periodensystem-online.de/index.php?sel=wertdesc&prop=pKb-Werte&show=list&el=92&id=acid Meeting the requirements specified in the above listed scenarios, a equivalent lignin mass ratio comprising 0.008 to 0.25 can be utilized to form an aqueous wax dispersion using the procedure described above. A equivalent lignin mass ratio α<0.008, for example α=0.005, results in a fine emulsion that breaks during cooling. (A flow chart depicting the various scenarios described above is shown in FIG. 3.)

Figure 6:
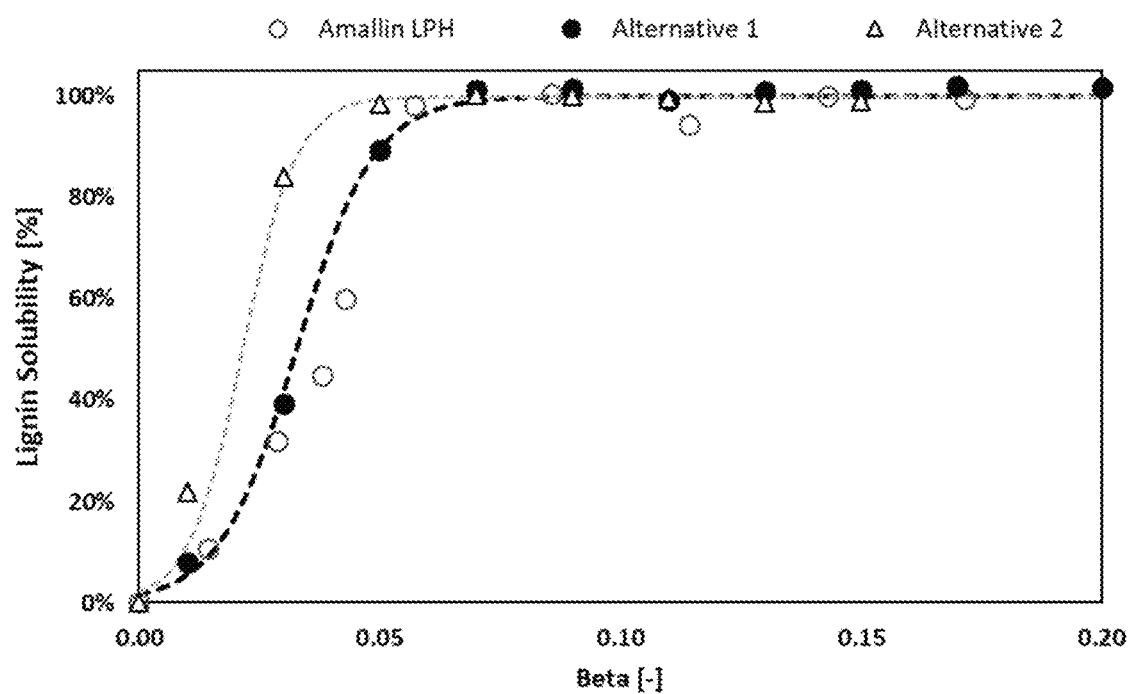
FIG. 6 depicts the percentage of lignin solubility for the commercially available purified Kraft lignin Amallin LPH and two alternative commercially available purified Kraft lignins as a function of the equivalent mass ratio of base to lignin. The base used has a pKa of greater than or equal to 9.4.

The standard procedure described above, has been carried out using the purified Kraft lignin Amallin LPH™ (from producer West Fraser, produced using the LignoForce process) to successfully produce stable aqueous wax dispersions. Amallin LPH™ was fully solubilized using potassium hydroxide at an equivalent base mass ratio β of 0.10, and, subsequently, used to emulsify Prowax 512™ at an equivalent lignin mass ratio α of 0.04. The final properties of the aqueous wax dispersion were measured as follows: solids=47.9%, viscosity=23 cP, and pH=11.2. Similar results have been obtained substituting other commercially available sources purified Kraft lignin for the Amallin LPH™. A graphical representation of the purified Kraft lignin solubility as a function of equivalent base mass ratio is provided in FIG. 6 including the results for Amallin LPH and the additional commercial sources which are identified as Alternative 1 and Alternative 2.

Again, following the standard procedure described above, various types of waxes have been successfully used to produce stable aqueous wax dispersions, using Amallin HPH™ (West Fraser) as an emulsifier as demonstrated in Table 2 below.

Dispersion Stability

Aqueous wax dispersions were subjected to three aqueous wax dispersion stability tests, as described below.

1) Shear stability test—Shear was applied to the aqueous wax dispersion using a Silverson L4R high-shear mixer at 8000 rpm. Shearing was continued until the aqueous wax dispersion breaks, or until the melting point of the wax is exceeded (at which point a wax emulsion is formed which will not break). The shear stability of the aqueous wax dispersion is expressed as the time until the wax dispersion breaks and the temperature that corresponds to that time point.

2) Foaming tendency and foam stability—100 mL of wax dispersion is placed inside a 250 mL graduated cylinder and manually shaken with a horizontal motion with an amplitude of 70 cm for 60 seconds. The cylinder is then placed on a horizontal surface. Immediately, the difference between the liquid meniscus and the surface of the foam is recorded, which numerically expresses the foaming tendency. This difference is recorded again after 5 minutes, which numerically expresses the foam stability or foam persistence.

3) Salt stability—a 100 mL 4.5 M sodium chloride solution is gradually added to a 250 g sample of aqueous wax dispersion under medium agitation until the aqueous wax dispersion breaks. The salt stability of the aqueous wax dispersion is expressed as the amount of sodium chloride added up to the point where the aqueous wax dispersion breaks.

The aqueous wax dispersions according to the application have been compared to aqueous wax dispersions made using

TABLE 2

| Wax | Type | Source | α [—] | β [—] | Solids [%] | Viscosity [cP] | pH [—] |
|---|---|---|---|---|---|---|---|
| Purewax ™ | Paraffin slack | Petroleum | 0.07 | 0.15 | 49.2 | 55 | 9.1 |
| Prowax ™ 460 | Paraffin slack | Petroleum | 0.07 | 0.15 | 49.9 | 32 | 9.5 |
| Prowax ™ 515 | Paraffin slack | Petroleum | 0.07 | 0.15 | 49.8 | 34 | 10.2 |
| SCP 125 | Natural | Hydrogenated Tallow | 0.07 | 0.15 | 50.1 | 279 | 9.7 |
| KENWAX ® MNSW | Slack | Petroleum | 0.07 | 0.15 | 50.9 | 47 | 11.4 |
| SX 50 | Synthetic | Fisher Tropsch | 0.07 | 0.15 | 49.4 | 24 | 9.7 | conventional emulsifiers such as sodium lignosulfonate, stearic acid, and behenic acid at commercially relevant levels. The results are shown in the Table 3 below:

TABLE 3

| Emulsifier | α [—] | Visc [cP] | Shear Stability [sec] | Shear Stability [° C.] | Foaming Tendency [mL] | Foam Persistence [mL] | Salt Stability [mmol] |
|---|---|---|---|---|---|---|---|
| Amallin LPH ™ | 0.4 | 0.008 | 21 | 5 | 24 | N/A | N/A | N/A |
| Amallin LPH ™ | 0.5 | 0.01 | 17 | 30 | 25 | 0 | 0 | DNB |
| Amallin LPH ™ | 1.0 | 0.02 | 19 | DNB | >80 | 0 | 0 | DNB |
| Amallin LPH ™ | 1.5 | 0.03 | 25 | DNB | >80 | 0 | 0 | DNB |
| Amallin LPH ™ | 10.0 | 0.25 | 200 | DNB | >80 | 0 | 0 | DNB |
| Lignosulfonate | 2.0 | — | 23 | 30 | 27 | 0 | 0 | DNB |
| Lignosulfonate | 4.0 | — | 36 | 260 | 42 | 0 | 0 | DNB |
| Stearic Acid | 1.8 | — | 118 | 241 | 42 | 27 | 24 | 72 |
| Stearic Acid | 3.6 | — | 276 | DNB | >80 | 28 | 20 | 114 |
| Behenic Acid | 1.1 | — | 26 | 300 | 53 | 0 | 0 | 21 |
| Behenic Acid | 2.2 | — | 50 | DNB | >80 | 0 | 0 | 85 |

* DNB = wax dispersion does not break; N/A = measurement could not be performed due to the low shear stability of the aqueous wax dispersion; all aqueous wax dispersions prepared at 50% solids using the same wax and produced using the process described above.

Table 3 demonstrates the unexpected advantage of using purified Kraft lignin as the emulsifier for aqueous wax dispersions. First, the aqueous wax dispersion has excellent shear stability at any lignin loading >1.0% (α=0.02), and does not break as the wax dispersion temperature exceeds the melting point of the wax. In comparison, a substantially higher emulsifier loading is required for the soap-based wax dispersions, which all break before the wax melting point temperature is reached.

Second, the aqueous wax dispersion of this invention has little to no tendency to foam. This is particularly apparent in comparison to some soap-based wax dispersions which generally display significant foaming tendency and a strong foam persistence.

Third, the aqueous wax dispersion has excellent salt stability and does not break as the total amount of salt solution is added. This is contrary, to the soap-based wax dispersions which all break upon the addition of salt.

Emulsion Stability

Aqueous wax emulsions were prepared using the following standard procedure. Emulsifying molten wax with an aqueous phase containing the water-soluble base and purified Kraft lignin. The molten wax and aqueous phase are emulsified under high shear to form a coarse emulsion. Second, the coarse emulsion is passed through a high-shear homogenizer to form a fine emulsion. Finally, the fine emulsion is kept at a temperature above the congealing point of the wax and under gentle agitation for at least one hour. All of the wax emulsions were prepared at 50% solids content using the same wax and produced using the process described above.

The aqueous wax emulsion stability is monitored visually for 1 hour for signs of (1) coalescence, or (2) lignin precipitation. Coalescence is defined as a reversible separation of the fine emulsion into two layers of which one is concentrated, and one is diluted in wax content (i.e. the fine emulsion is not longer homogeneous throughout). Lignin precipitation is defined as the presence of solid purified Kraft lignin particles in the fine emulsion (i.e. undissolved purified Kraft lignin).

Aqueous wax emulsions according to the application were prepared at decreasing equivalent lignin mass ratio. The results are shown in the Table 4 below:

TABLE 4

| Emulsifier [%] | α [—] | Wax Emulsion Stability | coalescence | Lignin precipitation |
|---|---|---|---|---|
| 10 | 0.25 | Stable | No | No |
| 1.0 | 0.02 | Stable | No | No |
| 0.50 | 0.01 | Stable | No | No |
| 0.40 | 0.008 | Stable | No | No |
| 0.20 | 0.004 | Stable | No | No |
| 0.10 | 0.002 | Stable | No | No |
| 0.0 | 0.0 | Not Stable | Yes | No |

The results in Tables 3 and 4 demonstrate that a stable aqueous wax emulsion can be made using purified Kraft Lignin at equivalent lignin mass ratios considerably lower than the minimal equivalent lignin mass ratio of 0.008 determined for manufacture of a stable aqueous wax dispersion.

Composite Wood Panel Manufacture

Panel Manufacture Example 1

Monolayer particleboard panels were pressed using Douglas Fir core wood chips. The panels were consolidated in a hot press at 174° F. to a dimension of 22"×22", a thickness of 0.5", and a target density of 40 lbs/cuft. A liquid melamine urea formaldehyde resin (1.05MR from Arclin) was used at 6% loading and a press factor of 14 s/mm. All wax dispersions were used at 1% loading. The consolidated panels were conditioned for 2 weeks and tested in accordance with ASTM D1037-12. The results for panel density and thickness swell are shown in Table 5.

TABLE 5

| Emulsifier | Emulsifier Loading [%] | Density [lbs/cuft] | 2 hr TS [%] | 8 hr TS [%] | 24 hr TS [%] |
|---|---|---|---|---|---|
| Amallin LPH/ KOH | 1.5 | 45.4 (0.8) | 7.0 (0.4) | 11.6 (0.6) | 20.3 (0.9) |
| Amallin LPH/ KOH | 10.0 | 45.5 (1.0) | 6.3 (0.7) | 12.2 (1.0) | 19.5 (1.6) |
| Amallin LPH/ NaOH | 1.5 | 43.4 (1.2) | 6.7 (0.6) | 11.9 (1.3) | 18.7 (1.1) |
| Amalin LPH/ MEA | 1.5 | 45.2 (2.8) | 6.9 (1.1) | 10.2 (1.6) | 18.5 (1.8) |
| Stearic Acid | 1.5 | 42.3 (1.9) | 6.4 (0.4) | 11.8 (0.8) | 18.5 (1.0) |
| Behenic Acid | 1.2 | 43.6 (0.3) | 6.9 (1.1) | 10.3 (1.6) | 18.5 (1.8) |

TS = thickness swell

Table 5 discloses that aqueous wax dispersions of this invention have comparable moisture repellent properties when compared to wax dispersions based on commercially available soap-based emulsifiers. In this example the performance of the wax appears unaffected by a substantial increase in the amount of purified Kraft lignin emulsifier used.

Panel Manufacture Example 2

Monolayer particleboard panels were pressed using particleboard wood chips. The panels were consolidated in a hot press at 390° F. to a dimension of 9"×9", a thickness of 0.5", and a target density of 44 lbs/cuft. A powdered phenol formaldehyde resin (from GP Resins) was used at 10% loading. All wax dispersions were used at 1% loading. The consolidated panels were conditioned overnight and tested in accordance with ASTM D1037-12. The results for panel density and thickness swell are shown in Table 6.

TABLE 6

| | Emulsifier Loading [%] | Density [lbs/cuft] | 24 hr TS [%] | 24 hr WA [%] | Rel. 24 hr TS [%] | TS/ Loading [%/%] | Rel. 24 hr WA [%] |
|---|---|---|---|---|---|---|---|
| Amallin LPH | 1.0 | 713 (17) | 7.34 (0.28) | 23.2 (0.8) | 100 | | 100 |
| Amallin LPH | 4.5 | 706 (14) | 8.93 (0.72) | 29.7 (1.5) | 122 | 0.049 | 127 |
| Stearic Acid | 1.0 | 707 (14) | 6.23 (0.67) | 21.0 (1.8) | 100 | | 100 |
| Stearic Acid | 4.5 | 703 (19) | 8.88 (0.68) | 30.5 (0.6) | 143 | 0.096 | 146 |
| Lignosulfonate | 4.0 | 723 (27) | 8.12 (0.90) | 24.0 (0.2) | 100 | | 100 |
| Lignosulfonate | 8.0 | 694 (6) | 9.99 (0.34) | 33.1 (1.8) | 123 | 0.115 | 138 |

TS = thickness swell;
WA = Water absorbance

Figure 7:
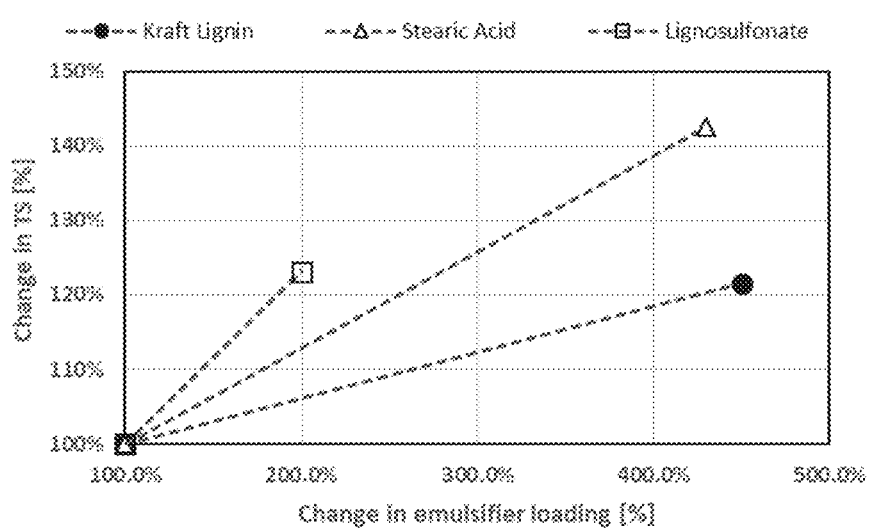
FIG. 7 depicts the relative change in thickness swell as a function of the relative change in emulsifier loading for Kraft lignin, lignosulfonate, and a stearic acid-based emulsifier.

Table 6 discloses that moisture repellent performance of aqueous wax dispersions of this invention are significantly less affected by a change in the emulsifier loading when compared to aqueous wax dispersions based on commercially available soap-based emulsifiers. The aqueous wax dispersions of the application thus combine excellent aqueous wax dispersion stability without compromising moisture repellent performance of wax in composite wood panels. From the table it can be observed that there is no statistical difference between emulsifiers at low emulsifier loading. It should be noted that for lignosulfonate a minimum 4% loading is needed to make emulsion stable wax dispersion and it is therefore not possible to increase the amount of lignosulfonate by 450%. The lignosulfonate was increased by only 200% rather than the 450% increase for the other emulsifiers. By comparing the thickness swell increase relative to emulsifier increase it is apparent that purified Kraft lignin (Amallin LPH) has the least impact on thickness swell. FIG. 7 is a graphical representation of the effect of emulsifier loading for Kraft lignin, stearic acid and lignosulfonate on the change in thickness swell.

Manufacturing methods can vary widely depending on the product and process used and would be familiar to one of skill in the art. In the case of medium density fiberboard, for example, the aqueous wax dispersion may be added just prior to the pressurized refiner. The fiber is then dried, formed into a mat, and pressed into the final product using a continuous or multi-opening press. In the case of particle board or OSB, the aqueous wax dispersion is typically added directly to the blender. Other methods will be known to a person of skill in the art.

Although the invention has been described with reference to certain specific embodiments, various modifications thereof will be apparent to those skilled in the art without departing from the purpose and scope of the invention as outlined in the claims appended hereto. Any examples provided herein are included solely for the purpose of illustrating the invention and are not intended to limit the invention in any way. Any drawings provided herein are solely for the purpose of illustrating various aspects of the invention and are not intended to limit the invention in any way. The disclosures of all prior art recited herein are incorporated herein by reference in their entirety.

We claim:

1. An aqueous wax emulsion or dispersion comprising:
   wax;
   water and
   an emulsifier, wherein the emulsifier is Kraft lignin,
   and a water-soluble base; and
   wherein, the water soluble base is present in an amount sufficient to dissolve the Kraft lignin wherein,
when the base has a pKa≥9.4, a minimum equivalent base mass ratio is about 0.07; and
when the base has a pKa<9.4, a minimum equivalent base mass ratio is greater than 0.07 and up to 0.17.

2. The aqueous wax emulsion or dispersion of claim 1, wherein the Kraft lignin is purified Kraft lignin.

3. The aqueous wax emulsion or dispersion of claim 2, wherein the purified Kraft lignin is purified by a LignoForce or LignoBoost process.

4. The aqueous wax emulsion or dispersion of claim 1, wherein the water-soluble base is selected from the group consisting of mono-functional amines, multi-functional amines, alkali metal salts, alkaline earth metal salts and combinations thereof.

5. The aqueous wax emulsion or dispersion of claim 1 wherein the base is potassium hydroxide, sodium hydroxide or monoethanolamine.

6. The aqueous wax emulsion or dispersion of claim 1 wherein the base is diethanolamine or triethanolamine.

7. The aqueous wax emulsion or dispersion of claim 1 wherein the base is a volatile base.

8. The aqueous wax emulsion or dispersion of claim 1 wherein the wax is paraffin slack wax, refined paraffin wax, Fisher Tropsch wax, polyethylene wax, synthetic wax, natural wax, or mixtures thereof.

9. The aqueous wax emulsion or dispersion of claim 8 wherein the polyethylene wax is oxidized polyethylene wax or maleated polyethylene wax.

10. The aqueous wax emulsion or dispersion of claim 8 wherein the natural wax is a vegetable wax or animal fat.

11. The aqueous wax emulsion or dispersion of claim 1 wherein an equivalent solubilized lignin mass ratio is greater than 0.008 and less than or equal to 0.25.

12. The aqueous wax emulsion or dispersion of claim 11 wherein the equivalent solubilized lignin mass ratio is greater than 0.01 and less than or equal to 0.1.

13. The aqueous wax emulsion or dispersion of claim 12 wherein the equivalent solubilized lignin mass ratio is greater than 0.02 and less than or equal to 0.04.

14. The aqueous wax emulsion or dispersion of claim 1 wherein an equivalent lignin mass ratio is greater than 0.5.

15. The aqueous wax emulsion or dispersion of claim 1 wherein an equivalent lignin mass ratio is less than 0.25.

16. The aqueous wax emulsion or dispersion of claim 1 wherein the wax comprises between 20 wt % to 60 wt % of the total solids of the aqueous wax emulsion or dispersion.

17. The aqueous wax emulsion or dispersion of claim 1 wherein an equivalent solubilized lignin mass ratio is greater than 0.002 and less than or equal to 0.25.

18. An aqueous wax emulsion or dispersion according to claim 1, wherein the aqueous wax emulsion or dispersion does not include lignosulfonate.

* * * * *